United States Patent [19]

Moore

[11] Patent Number: 4,819,446

[45] Date of Patent: * Apr. 11, 1989

[54] WASTE HEAT COOLING APPARATUS

[76] Inventor: Roy A. Moore, Rte. 1, Box 637-Cl, Jacksonville, Ala. 36265

[*] Notice: The portion of the term of this patent subsequent to Nov. 3, 2004 has been disclaimed.

[21] Appl. No.: 95,010

[22] Filed: Sep. 8, 1987

Related U.S. Application Data

[63] Continuation-in-part of Ser. No. 941,709, Dec. 15, 1986, Pat. No. 4,703,629.

[51] Int. Cl.⁴ ............................................. F25B 27/00
[52] U.S. Cl. ..................................... 62/238.3; 62/271; 62/477
[58] Field of Search ..................... 62/235.1, 238.3, 92, 62/93, 94, 271, 272, 477, 476

[56] References Cited

U.S. PATENT DOCUMENTS 4,523,438 6/1985 Curti .................................. 62/238.6
4,703,629 11/1987 Moore ............................... 62/235.1

Primary Examiner—Henry A. Bennet
Attorney, Agent, or Firm—Jennings, Carter, Thompson & Veal

[57] ABSTRACT

A waste heat powered cooling apparatus utilizes a waste heat collector to convert wasted energy into heat stored in water. An evacuated chamber houses a desiccant bed and a sprayer which introduces an adsorbate into contact with a heat exchanger conduit extending within the chamber. Evaporation of the adsorbate in contact with the conduit cools a medium circulated within the conduit between the chamber and a chilled water reservoir. The evaporated adsorbate is adsorbed by the desiccant bed until a predetermined temperature or saturation level is reached, at which point, heated water from the waste heat collector is passed through heat exchanger conduits in the desiccant bed to regenerate the desiccant bed. Iterative adsorption and regeneration cycles maintain the chilled water in a desired temperature range.

20 Claims, 4 Drawing Sheets

WASTE HEAT COOLING APPARATUS

This is a continuation-in-part of application Ser. No. 941,709, "SOLAR COOLING APPARATUS", filed Dec. 15, 1986 and now U.S. Pat. No. 4,703,629.

FIELD OF THE INVENTION

The present invention relates to the use of waste heat energy as a source of power for cooling or refrigeration. More particularly the present invention relates to the use of waste heat energy as a means for regenerating an adsorption cooling unit. In even greater particularity the present invention may be described as an adsorption cooling apparatus which uses waste heat heated water to regenerate a desiccant cooling bed.

BACKGROUND OF THE INVENTION

The phenomenon of adsorption cooling is well documented. Such cooling was the basis of the so-called gas refrigerators which used a flammable gas to evaporate a liquid refrigerant such as ammonia from a solution so that the ammonia could be condensed in purer form to serve as an evaporative heat sink. Many other variations have doubtlessly been attempted. Due to the toxic nature of ammonia, many other refrigerants have been substituted and due to the difficulty in locating flammable gases at remote areas, most cooling and refrigeration in the U.S. today is done by electrically powered compression refrigeration. Numerous attempts have been made to produce efficient heat exchange apparatus which do not rely on fossil fuels for their primary energy source. Examples of prior cooling methods are provided by U.S. Pat. Nos. 4,171,620; 4,222,244; 4,227,375; and 4,635,460. Waste heat may be derived from any source such as from commercial buildings, industrial operations, and, obviously, the sun in any manner which is convenient.

SUMMARY OF THE INVENTION

It is the object of my invention to provide efficient economical cooling of a defined volume such as a home.

Another object of my invention is to provide a cooling system which derives its primary energy requirements from waste heat energy.

Yet another object of my invention is to eliminate the need for toxic refrigerants in a home cooling system.

Still another object of my invention is to provide a system which may be adapted to provide waste heat powered refrigeration.

These and other objects and advantages of my invention are accomplished through the use of an efficient waste heat collector or a solar collector which tracks the movement of the sun such as is disclosed in my co-pending application Ser. No. 758,422. The waste heat collector converts waste heat energy, which is otherwise lost, into heat contained within a volume of water which is stored in the system. The heated water is used as needed to "regenerate" a desiccant bed as hereinafter described.

The desiccant bed is contained within a low pressure chamber wherein the partial pressure of water is maintained in a desired range which facilitates the boiling of water at a low temperature, for example 59° at a partial pressure of 0.50 inches of mercury. The desiccant bed is interlaced with a heat exchanger conduit network which supplies water as a heat exchanger medium from either the waste heat collector in a regeneration mode or an ambient temperature heat source such as a cooling tower in a cooling mode. Also contained within the chamber is a sprayer for injecting water into the chamber and a second heat exchanger conduit network which utilizes water as a heat exchange medium from a chilled water reservoir. Water from the sprayer is directed onto the second heat exchanger network and extracts sufficient heat therefrom to boil the water, thereby cooling the medium. The resultant water vapors are adsorbed by the desiccant, retrieving heat from the first heat exchanger network. When the desiccant becomes saturated, hot water from the waste heat collector is forced through the first heat exchanger network, thereby giving up heat to the desiccant bed and driving the adsorbed water back into vapor. Meanwhile, cooler water from the ambient temperature heat source is circulated through the second heat exchanger network resulting in condensation of the water vapor which is collected in an adsorbate collection chamber for re-circulation through the sprayer. Through the use of multiple stages and the introduction of simple antifreeze solution to the heat transfer medium the end temperature can be reduced below 32° F. The only energy input to the system other than waste heat energy is used to drive pumps in the heat exchanger networks and sprayer assembly, which represents a considerable reduction in the energy required to cool a home or freeze water.

BRIEF DESCRIPTION OF THE DRAWINGS

Apparatus embodying features of my invention are depicted in the appended figures which form a portion of this application and wherein.

DESCRIPTION OF A PREFERRED EMBODIMENT

Figure 1:
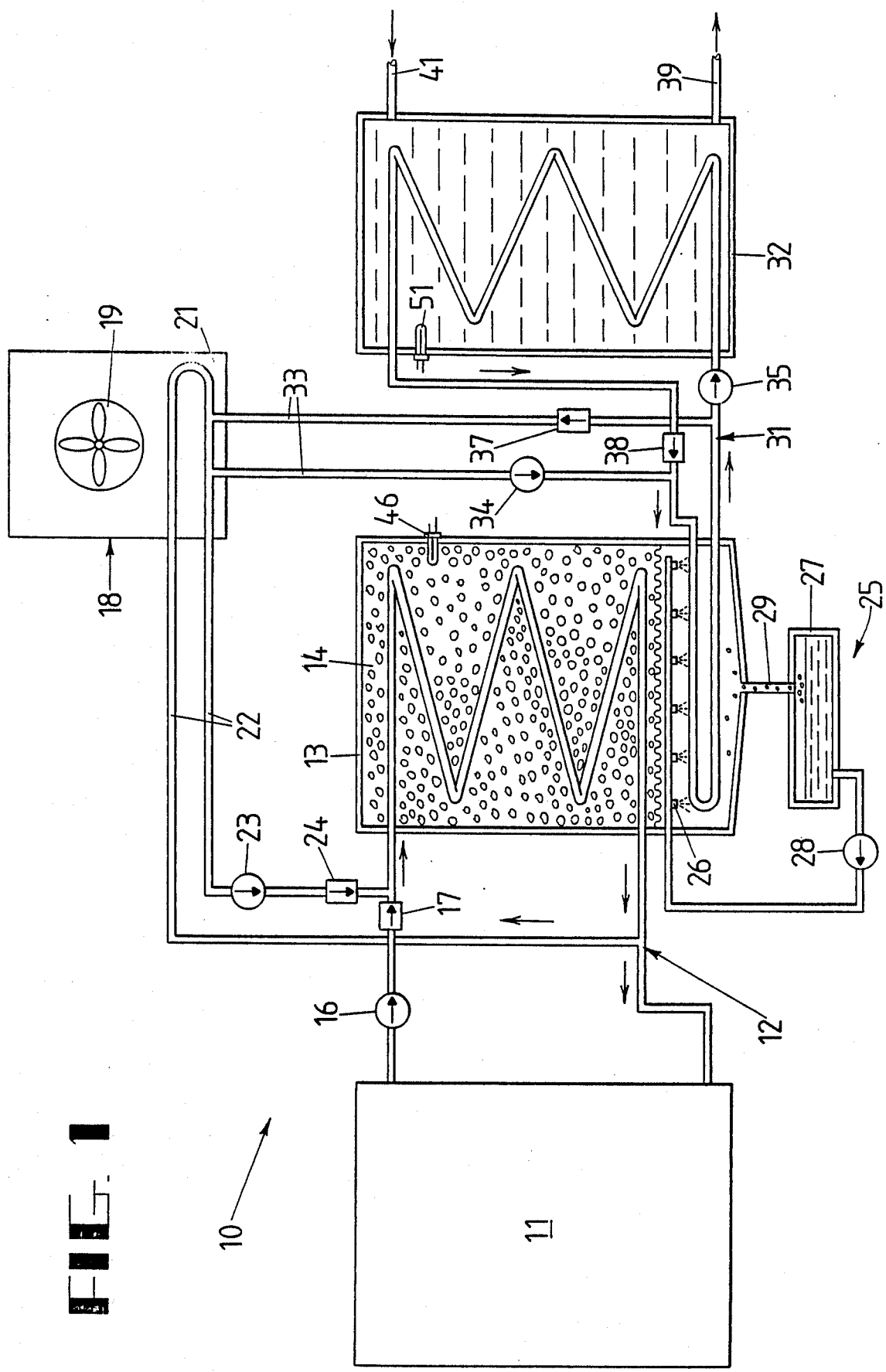
FIG. 1 is a schematic representation of a waste heat cooling apparatus which can be used for normal cooling.

Referring to FIG. 1, a waste heat air-conditioning unit 10 would include a waste heat collector and storage system 11, which is the primary source of energy input to the unit 10 and is hereinafter referred to as input system 11. Input system 11 may be any waste heat powered system which can heat water and maintain it at above 140° F. Such results are readily achieved with my solar tracker as disclosed in my U.S. Pat. No. 4,649,899.

A conduit type input heat exchanger network 12, containing water as a heat exchanger medium, extends from the input system 11 into a housing 13 which defines a low pressure chamber within which a desiccant bed 14 is confined. The heat exchanger network 12 extends within the desiccant bed 14 to the extent necessary for efficient heat exchange given the generally low thermal transfer characteristics of desiccants. The preferred adsorbent for use in the desiccant bed 14 is a silica gel which offers excellent adsorption characteristics for this application. The heat exchanger network 12 includes an input pump 16 which is operated to circulate hot water through the input system 11 to the desiccant bed 14.

An ambient temperature heat exchanger unit 18, which may be a truly ambient heat exchanger or a common variant such as an evaporative cooling tower having a fan 19 and sump 21, is connected to the input heat exchanger network 12 by conduits 22. A cooling pump 23 is used to circulate water from the ambient temperature heat exchanger unit 18 through the desiccant bed 14. Check valve 17 prevents circulation from the ambient temperature heat exchanger unit 18 to the input system and check valve 24 prevents flow from the input system 11 to the ambient temperature heat exchanger unit 18.

An adsorbate pumping unit 25 introduces and removes the adsorbate from the chamber. Located within the lower portion of the housing 13 is a sprayer 26 which receives and disperses water from an adsorbate collection tank 27 via an adsorbate pump 28. The collection tank 27 communicates with the bottom of housing 13 through a conduit 29 such that any water accumulated therein is drained by gravity into the collection tank 27. Obviously, the bottom of the housing 13 is preferentially inclined toward conduit 29. The housing 13 is maintained at a sub-atmospheric pressure, therefore adsorbate pump 28 is preferentially a magnetically driven pump capable of providing sufficient flow to the sprayer 26 without compromising the low pressure within the housing.

Also extending into the housing 13 is a conduit type chilled water heat exchanger network 31 which also uses water as the heat exchange medium. This network 31 circulates water through a chilled water reservoir 32 into the housing 13 proximal the sprayer 26 such that water sprayed thereby comes into contact with the network 31. A chilled water pump 35 is operated to provide the flow through the heat exchanger network 31 and reservoir 32.

A second set of conduits 33 connects the ambient temperature heat exchange unit 18 with the chilled water heat exchange network 31 and a second cooling pump 34 circulates water between the housing 13 and the ambient temperature heat exchange unit 18. Check valve 37 prevents circulation of water from the heat exchange unit 18 by the chilled water pump 35 and a check valve 38 prevents circulation of water through chilled water reservoir 32 by the second cooling pump 34. The reservoir 12 has an outlet 39 and a return 41 through which chilled water is supplied to a house in conventional manner to cool the air therein.

Figure 4:
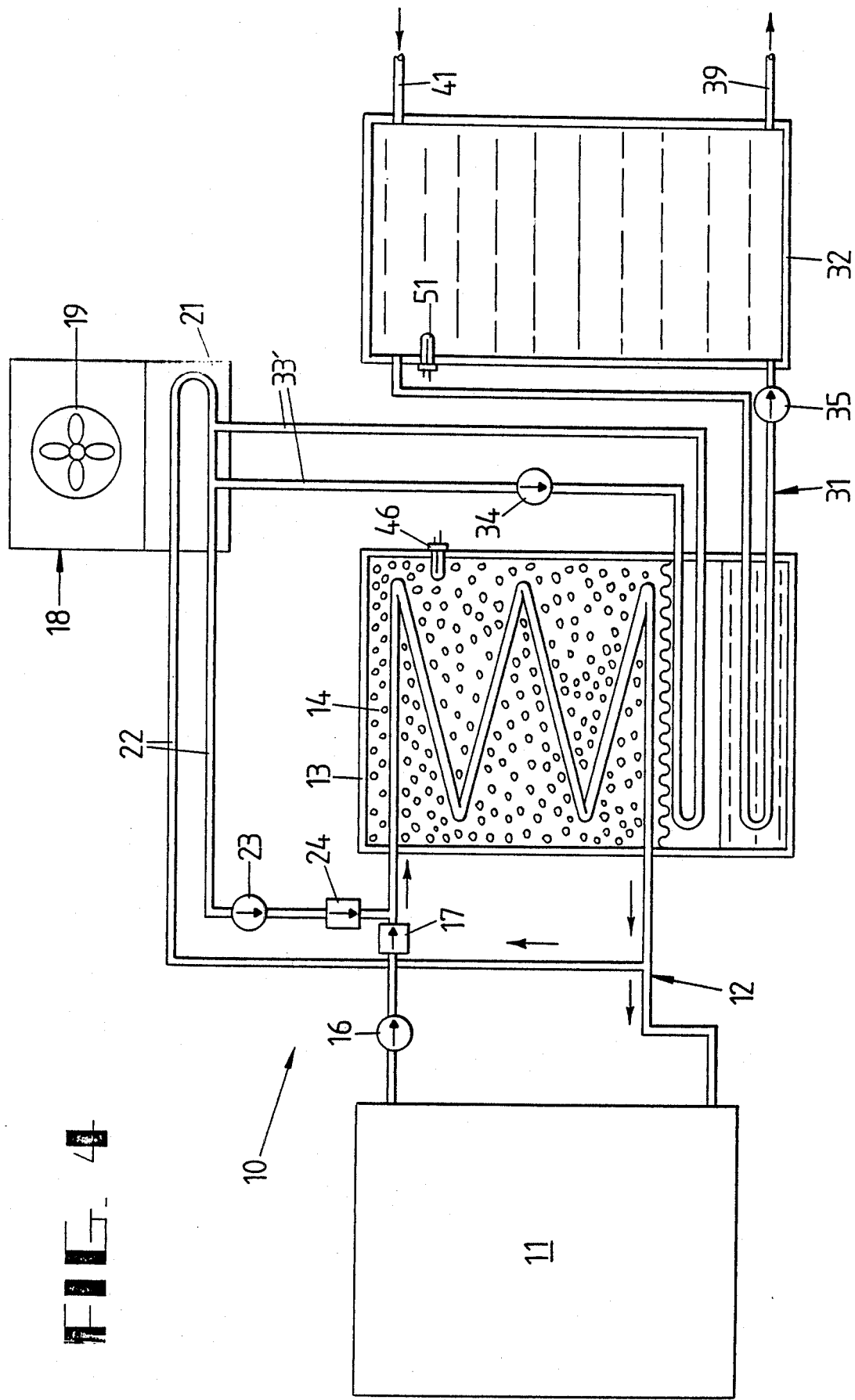
FIG. 4 is a schematic representation of a second embodiment of a water heat cooling apparatus.

A second embodiment is shown in FIG. 4 wherein the second set of conduits are designated as 33′ and do not connect with the chilled water heat exchange network 31. In this embodiment the adsorbate pumping unit 25 and the sprayer 26 are eliminated. The internal piping within housing 13 is also eliminated such that chilled water from the reservoir 13 is circulated directly through the heat exchanger network 31.

Figure 2:
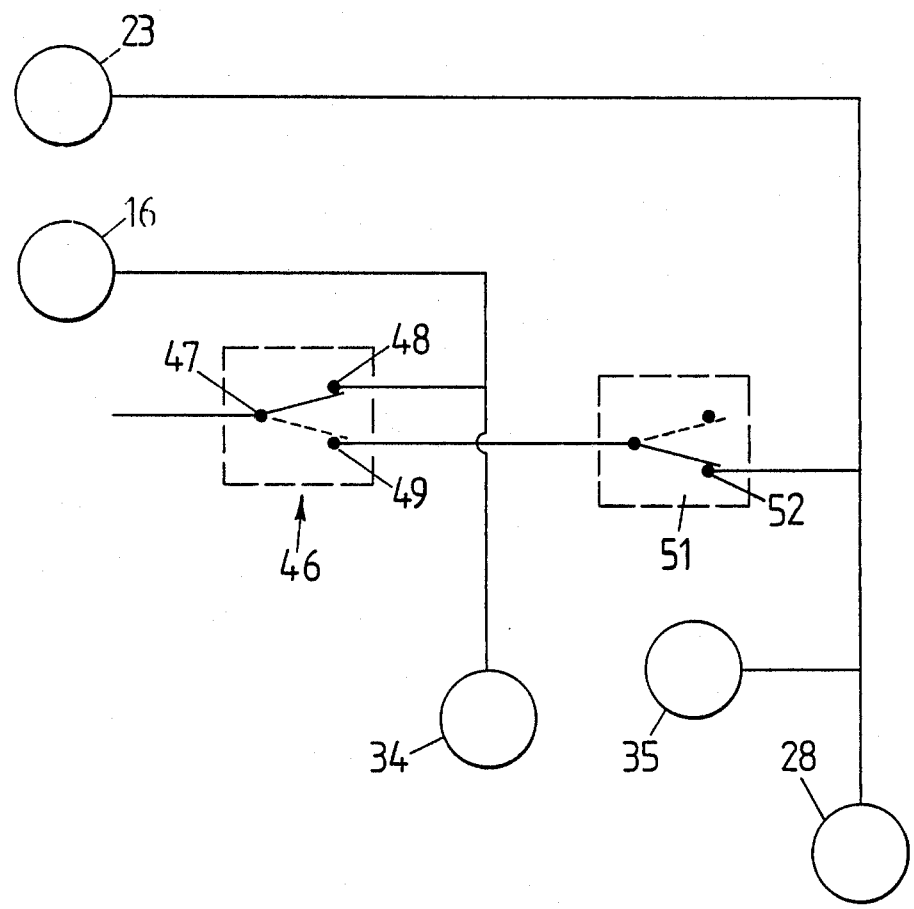
FIG. 2 is a schematic representation of the electrical circuit of the apparatus.

Referring to FIGS. 1 and 2, it will be seen that a first thermostat 46 is located in the housing 13 to sense the temperature of the desiccant bed 14. This thermostat 46 has an input terminal 47 connected to an electrical power source and two output terminals 48 and 49. Output terminal 48 is electrically connected to input pump 16 and second cooling pump 34. Output terminal 49 is electrically connected to a second thermostat 51 which is located in reservoir 32 and senses the temperature of the chilled water. The thermostat 51 has a single output terminal 52 which is normally open and which is electrically connected to first cooling pump 23, adsorbate pump 28 and chilled water pump 35.

Note that adsorbate pump 28 is not used in the second embodiment in as much as water is allowed to remain in the bottom of the chamber.

In operation, with silica gel used as the desiccant, and distilled water used as the adsorbate, the housing 13 is maintained under a sub-atmospheric pressure such that the water partial pressure have value of about 0.40 to about 0.50 inches of mercury. In this range of partial pressures, water boils at from about 53° F. to about 59° F. At the midpoint of the range or about 0.45 inches of mercury, the boiling point of water is 56° F. Silica gel is a poor thermal conductor however its capacity to hold adsorbed water is proportional to the temperature of the silica gel. Thus a desiccant bed in an atmosphere where the water partial pressure is 0.40 inches of mercury at 140° F. has the capacity to hold a water content at about 4% of the weight of the bed and at 95° F. has the capacity to hold a water content at about 14% of the weight of the bed. In as much as the cooling capability of the system is dependent on the amount of water vaporized in the housing, it is clear that the size of the housing and the weight of the desiccant bed 14 will be proportional to the amount of cooling required.

A description of one cycle of operation of the system illustrates the above correlations. As a starting point, assume that the temperature of the desiccant bed 14 has just reached 140° F. At that point, the thermostat 46 connects the electrical power source to thermostat 51 via output terminal 49. When the temperature of the chilled water in reservoir 32 reaches 63° F., the thermostat 51 closes and supplies current to pumps 23, 28 and 35. The chilled water pump 35 circulates water within heat exchanger network 31 into housing 13 wherein adsorbate pump 28 delivers distilled water to the sprayer 26 such that the water can be sprayed onto the heat exchanger network 31. The water sprayed thereon is boiled off at 56° F. in the low pressure chamber, thereby extracting heat from the circulating water in the heat exchanger network 31 which in turn extract heat from the chilled water in reservoir 32. The water vapor created by this boiling passes into the porous desiccant bed 14 and is adsorbed releasing heat to the desiccant bed 14; however cooling pump 23 circulates water from the ambient temperature heat exchanger unit 18 through the desiccant bed to remove the heat of adsorption and to cool the desiccant bed 14. The input temperature of the water from unit 18 to the desiccant bed is approximately 85° F. which is readily maintained by most conventional cooling towers in most locales. When the temperature of the chilled water in reservoir 32 reaches 60° F., the thermostat 51 opens and the pumps 23, 28 and 35 stop. This sequence is repeated until the temperature of the desiccant bed 14 is lowered to about 95° F., at which point the thermostat 46 opens output terminal 49 and closes output terminal 48 thereby supplying electrical current to pumps 16 and 34. Input pump 16 circulates water at above 140° F. through the input heat transfer network 12 which heats the desiccant bed 14 thereby reducing the bed's capacity to hold water and forcing the water back into vapor. Meanwhile cooling pump 34 is circulating water at 85° F. through the portion of the chilled water heat exchanger network 31 within the housing 13, thereby causing the water driven from the desiccant bed 14 to condense, giving up heat to be dispersed by the cooling tower. The water accumulates in the bottom of the housing 13 where it remains or drains into accumulation tank 27. When the temperature of the desiccant bed reaches 140° F., the bed is deemed to have been purged of moisture and is thus regenerated and ready to being a new cooling cycle, thus the thermostat 46 opens to output terminal 49 and closes to output terminal 48. The cycle is repeated for as long as necessary. Of course, sufficient hot water for regeneration must be stored in the input system 11 to permit regeneration during the night. The rate at which the apparatus cycles depends on the rate of flow of the adsorbate pump 28 and the capacity of the desiccant bed 14 as well as the efficiency of the input heat exchanger network 11 in regenerating the desiccant bed, thus the cycle time depends on the physical parameters of the unit which is in turn dependent upon the utilization of the unit. A prototype used for cooling purposes has been found to operate satisfactorily with a cycle time of about one hour equally divided between regeneration time and cooling time. The energy requirement to drive the pumps is less than is necessary to burn five 100 watt light bulbs.

Figure 3:
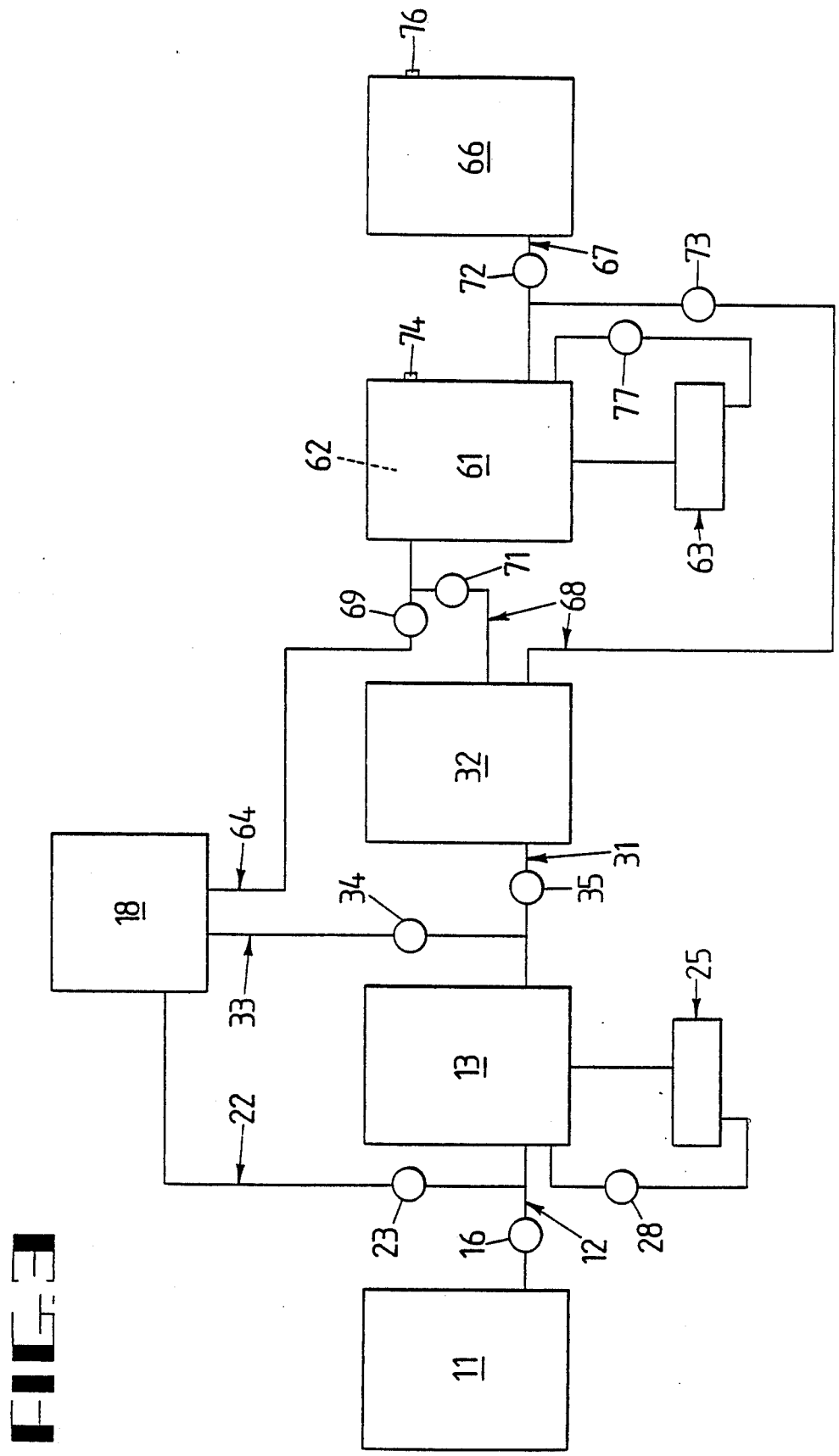
FIG. 3 is a schematic representation of a multi-stage waste heat cooling unit which can be used for refrigeration-type cooling.

FIG. 3 illustrates a multi-stage unit which can be used to further reduce the output temperature. In this embodiment, a second desiccant chamber 61 maintains a second desiccant bed 62 at a lower water partial pressure such that water introduced by a second adsorbate pumping unit 63 boils at a lower temperature. For example, in a system with a water partial pressure of 0.20 inches of mercury, water boils at 35° F. and in a system with a water partial pressure of 0.10 inches of mercury, water boils at 20° F. A regeneration heat exchanger network 64 extends through the second desiccant bed 62 and circulates water from either the ambient temperature heat exchanger unit 18 or input system 11. A second reservoir 66 for a refrigerant is provided and a tertiary heat exchanger network 67 is provided between the second chamber 61 and second reservoir 66 in the same manner as chilled water heat exchanger network 31 is provided between housing 13 and reservoir 32. Inasmuch as lower temperatures are being used, it may be necessary to use a mixture of water and antifreeze (alcohol) as the refrigerant or medium in the heat exchanger conduits of this stage. The extraction of heat from the second desiccant bed 62 during the cooling phase and the condensation of the adsorbate during the regeneration phase of the cycle utilizes an auxiliary heat exchanger conduit 68 system connected to circulate refrigerant cooled within reservoir 32 through the regeneration conduit network 64 and the tertiary conduit network 67 in the same manner as described with respect to conduits 22 and 33 above. Appropriate pumps 69, 71, 72 and 73 are used to circulate the refrigerant and check valves (not shown) are used to insure proper flow. Thermostats 74 and 76 control the operation of these pumps and second adsorbate pump 77.

While I have shown my invention in various forms, it will be obvious to those skilled in the art that it is not so limited but is susceptible of various changes and modifications without departing from the spirit thereof.

What I claim is:

1. Apparatus for cooling a desired volume of space comprising:
   (a) waste heat recovery means for heating water to a predetermined temperature from a waste heat source and storing said water at or above said temperature;
   (b) chamber means for housing a quantity of desiccant at a subatmospheric pressure;
   (c) reservoir means for holding chilled water;
   (d) adsorbate means for introducing and removing water from said chamber means;
   (e) first means for circulating water through said waste heat recovery means and through said desiccant in said chamber means;
   (f) second means for circulating water through said reservoir means and a portion of said chamber means proximal said adsorbate means;
   (g) ambient temperature heat exchanger means for cooling the water in said first or second means for circulating water operably connected to divert water selectively from said first or second means for circulating water;
   (h) circuit means for controlling water flow through said first and second means for circulating water and said adsorbate means responsive to the temperature in said chamber means and said reservoir means; and
   (i) output means connected to said reservoir means for circulating chilled water therein to cool said volume.

2. Apparatus as defined in claim 1 wherein said circuit means comprises:
   (a) first thermostat connected to said chamber means for sensing the temperature therein and having an input terminal connected to a source of electrical current and a first and second output terminal selectively connected to said input terminal in accordance with the temperature sensed;
   (b) an input pump connected to said first output terminal for circulating water in said first means for circulating water between said waste heat recovery means and said chamber means;
   (c) first cooling pump electrically connected to said first output terminal for circulating water in said second means for circulating water between said chamber means and said ambient temperature heat exchanger means;
   (d) second thermostat connected to said reservoir means for sensing the temperature of the chilled water therein and having an input terminal electrically connected to the second output terminal of said first thermostat and a normally open output terminal;
   (e) adsorbate pump electrically connected to said normally open output terminal for introducing water into said chamber via said adsorbate means;
   (f) chilled water pump electrically connected to said normally open output terminal for circulating water within said second means for circulating water between said chamber means and said reservoir means; and
   (g) second cooling pump electrically connected to said normally open output terminal for circulating water in said first means for circulating water between said chamber means and said ambient temperature heat exchanger means.

3. Apparatus as defined in claim 2 wherein said ambient temperature heat exchanger is a cooling tower.

4. Apparatus as defined in claim 3 wherein said desiccant is silica gel and said sub-atmospheric is maintained in a range from about 0.40 atmospheres to 0.50 atmospheres.

5. Apparatus as defined in claim 4 wherein said first thermostat connects said source of electric current to said first output terminal when the temperature in said chamber means reaches approximately 95° F. and connects said source of electrical current to said second output terminal when the temperature of said chamber means reaches approximately 140° F.

6. Apparatus as defined in claim 1 wherein said desiccant is silica gel and said sub-atmospheric pressure is maintained in a range from about 0.40 atmospheres to 0.50 atmospheres.

7. Apparatus as defined in claim 6 wherein said first means for circulating water between said waste heat recovery means and said chamber means to raise the temperature of said desiccant bed from about 95° F. to about 140° F.

8. Apparatus as defined in claim 1 wherein said first means for circulating water comprises a water filled primary conduit extending within said desiccant and within said waste heat recovery means, an input pump connected to said primary conduit for circulating water therein, a water filled secondary conduit connected between said primary conduit and said ambient temperature heat exchanger means, a first cooling pump connected to said secondary conduit for circulating water between said chamber and said ambient temperature heat exchanger means; and said second means for circulating water comprises a water filled main conduit extending within said reservoir means and said chamber means, a chilled water pump connected to said main conduit for circulating water therein, a water filled auxiliary conduit connected between said main conduit and said ambient temperature heat exchanger means, and a second cooling pump connected to said auxiliary conduit for circulating water between said chamber and said ambient temperature heat exchanger.

9. Apparatus as defined in claim 8 wherein said adsorbate means comprises a gravity collector cooperatively positioned beneath said chamber means for collecting water condensed therein, sprayer means connected to said gravity collector for dispersing water therefrom proximal said main conduit with said chamber means, and an adsorbate pump connected to urge water from said gravity collector to said sprayer means.

10. Apparatus as defined in claim 2 wherein said circuit means comprises:
(a) first thermostat positioned to sense the temperature of said desiccant with said chamber means having an electrical input terminal connected to a source of electrical power and first and second output terminals selectively connected to said input terminal in accordance with the temperature of said desiccant, with said first output terminal electrically connected to said input pump and said first cooling pump; and
(b) a second thermostat positioned to sense the temperature of said chilled water in said reservoir means and having an input terminal electrically connected to said second output terminal and having a normally open output terminal connected to said chilled water pump, to said second cooling pump, and to said adsorbate pump.

11. Apparatus as defined in claim 10 wherein said desiccant is silica gel and said sub-atmospheric pressure is maintained in a range from about 0.40 atmospheres to 0.50 atmospheres.

12. Apparatus as defined in claim 11 wherein said first thermostat connects said source of electric current to said first output terminal when the temperature in said chamber means reaches approximately 95° F. and connects said source of electrical current to said second output terminal when the temperature of said chamber means reaches approximately 140° F.

13. Apparatus as defined in claim 2 wherein said chamber means comprises a housing for containing said desiccant at subatmospheric pressure having a desiccant bed located in the upper portion of said housing in thermal communication with said first means for circulating water and an evaporator region located in the lower portion thereof wherein said adsorbate means and said second means for circulating water are positioned proximal each other.

14. Apparatus as defined in claim 1 wherein said output means comprises:
(a) second chamber means for housing a quantity of desiccant at a lower sub atmospheric pressure;
(b) second reservoir means for holding a refrigerant;
(c) second adsorbate means for introducing and removing refrigerant into said second chamber;
(d) secondary heat exchanger means for circulating water through said ambient temperature heat exchanger means and said desiccant in said second chamber means;
(e) tertiary heat exchanger means for circulating refrigerant through said second reservoir means and said second chamber means wherein said refrigerant is a mixture of water and alcohol; and
(f) auxiliary cooling means for selectively extracting heat from said desiccant in said second chamber or for extracting heat from said refrigerant in said tertiary heat exchanger means by circulation thereof through said reservoir means.

15. Apparatus as defined in claim 13 wherein said circuit means comprises:
(a) first thermostat positioned to sense the temperature of said desiccant with said chamber means having an electrical input terminal connected to a source of electrical power and first and second output terminals selectively connected to said input terminal in accordance with the temperature of said desiccant, with said first output terminal electrically connected to said input pump and said first cooling pump; and
(b) a second thermostat positioned to sense the temperature of said chilled water in said reservoir means and having an input terminal electrically connected to said second output terminal and having a normally open output terminal connected to said chilled water pump, to said second cooling pump, and to said adsorbate pump.

16. Apparatus as defined in claim 15 wherein said desiccant is silica gel and said sub-atmospheric pressure is maintained in a range from about 0.40 atmospheres to 0.50 atmospheres.

17. Apparatus as defined in claim 16 wherein said first thermostat connects said source of electric current to said first output terminal when the temperature in said chamber means reaches approximately 95° F. and connects said source of electrical current to said second output terminal when the temperature of said chamber means reaches approximately 140° F.

18. Apparatus for cooling a desired volume of space comprising:
(a) waste heat recovery means for heating water to a predetermined temperature from a waste heat source and storing said water at or above said temperature;

(b) chamber means for housing a quantity a desiccant at a subatmospheric pressure above a volume of water;
(c) reservoir means for holding chilled water;
(d) means for circulating said chilled water through said volume of water in said chamber means;
(e) first means for circulating water through said waste heat recovery means and through said desiccant in said chamber means;
(f) second means for circulating water through a portion of said chamber means intermediate said desiccant and said volume of water;
(g) ambient temperature heat exchanger means for cooling the water in said first or second means for circulating water operably connected to divert water selectively from said first and second means for circulating water;
(h) circuit means for controlling water flow through said first and second means for circulating water and said means for circulating chilled water responsive to the temperature in said chamber means and said reservoir means; and
(i) output means connected to said reservoir means for circulating chilled water therein to cool said volume of space.

19. Apparatus as defined in claim 18 wherein said circuit means comprises:
(a) a first thermostat connected to said chamber means for sensing the temperature therein and having an input terminal connected to a source of electrical current and a first and second output terminal selectively connected to said input terminal in accordance with the temperature sensed;
(b) an input pump connected to said first output terminal for circulating water in said first means for circulating water between said input means and said chamber means;
(c) first cooling pump electrically connected to said first output terminal for circulating water in said second means for circulating water between said chamber means and said ambient temperature heat exchanger means;
(d) second thermostat connected to said reservoir means for sensing the temperature of the chilled water therein and having an input terminal electrically connected to the second output terminal of said first thermostat and a normally open output terminal;
(e) chilled water pump electrically connected to said normally open output terminal for circulating water within said means for circulating chilled water between said chamber means and said reservoir means; and
(f) second cooling pump electrically connected to said normally open output terminal for circulating water in said first means for circulating water between said chamber means and said ambient temperature heat exchanger means.

20. Apparatus as defined in claim 18 wherein said output means comprises:
(a) second chamber means for housing a quantity of desiccant at a lower sub-atmospheric pressure;
(b) second reservoir means for holding a refrigerant;
(c) means for circulating water through said ambient temperature heat exchanger means and said desiccant in said chamber means;
(d) means for circulating refrigerant through said second reservoir means and said second chamber means wherein said refrigerant is a mixture of water and alcohol; and
(e) auxiliary cooling means for selectively condensing water driven from said desiccant in said second chamber.

* * * * *